United States Patent [19]

Greiner

[11] 4,203,776

[45] May 20, 1980

[54] AQUEOUS FORTIFIED ROSIN DISPERSIONS

[75] Inventor: Richard W. Greiner, New Castle County, Del.

[73] Assignee: Hercules Incorporated, Wilmington, Del.

[21] Appl. No.: 943,898

[22] Filed: Sep. 19, 1978

Related U.S. Application Data

[63] Continuation-in-part of Ser. No. 790,650, Apr. 25, 1977, abandoned.

[51] Int. Cl.$^2$ ............................................. C08L 93/04
[52] U.S. Cl. ..................................................... 106/238
[58] Field of Search ............................... 106/236–238, 106/239; 162/180; 252/359

[56] References Cited

U.S. PATENT DOCUMENTS

| | | | |
|---|---|---|---|
| 2,176,423 | 10/1939 | Jaeger | 252/354 |
| 2,393,179 | 1/1946 | Mashburn | 106/144 |
| 2,628,918 | 2/1953 | Wilson et al. | 106/238 |
| 2,684,300 | 7/1954 | Wilson et al. | 106/238 |
| 3,329,640 | 7/1967 | Scott et al. | 260/29.6 MQ |
| 3,565,755 | 2/1971 | Davison | 162/168 |
| 3,906,142 | 9/1975 | Dowthwaite et al. | 106/239 |
| 4,071,375 | 1/1978 | Ishibe et al. | 106/238 |
| 4,148,665 | 4/1979 | Kulick et al. | 106/236 |

FOREIGN PATENT DOCUMENTS 399874 1/1934 Belgium .
2240264 3/1975 France .

OTHER PUBLICATIONS

Auslegeschriften, 1,131,348, Peter K. Wieger, 14 Jun. 1962.
Offenlegungsschrift, 24 37656, J. T. Daust, 20 Feb. 1975.

*Primary Examiner*—Theodore Morris

[57] ABSTRACT

Disclosed is a process for preparing paper size from fortified rosin wherein salts of sulfosuccinates of ethylene oxide condensates are employed as dispersing agents.

10 Claims, No Drawings

AQUEOUS FORTIFIED ROSIN DISPERSIONS

This application is a continuation-in-part of application Ser. No. 790,650, filed Apr. 25, 1977, now abandoned.

This invention relates to a method of preparing aqueous dispersions of fortified rosin, to the aqueous dispersions thus prepared, and to their use in the manufacture of sized paper products.

Internal sizing of paper with rosin is disucussed by Casey, Pulp and Paper, Second Edition, Volume II: Papermaking, Chapter XIII, pages 1043-1066, reference to which is hereby made.

At page 1048 Casey discusses fortified rosin size and states that fortified rosin sizes are made by reacting maleic anhydride or other dienophiles with rosin to increase the number of carboxylic acid groups. Casey also states that a typical fortified size may contain about 1% to 30% of maleopimaric acid anyhdride.

Casey, at page 1047, under the heading "Free Rosin Size", states that the relative merits of high free rosin size and low free rosin size has been a controversial subject for many years but that it is now pretty generally recognized that high free rosin size results in better sizing and uses less alum.

At page 1050, under the heading "Protected Rosin Size", Casey states that by using a protective colloid it is possible to prepare highly stable size containing as high as 90% free rosin. At page 1051 Cases discusses the Bewoid process for preparing a high free rosin size and states that Bewoid size, as usually prepared, containing about 90% free rosin dispersed in a small amount of rosin soap and stabilized by the presence of about 2% casein or other protein. The casein is used as a protective colloid to prevent growth of rosin particles, thereby maintaining them in a state of fine subdivision.

Casey states further that the Bewoid process involves the mechanical subdivision of rosin in the presence of about 1 to 2% sodium hydroxide and about 2% casein. The rosin is heated and subjected to mechanical shearing stress until it is subdivided into small particles. A small amount of caustic soda (1.6 parts per 100 parts of rosin) is then added to the melted rosin to saponify part of it, and then casein (2.0 parts casein dispersed in 0.2 part caustic) is added to stabilize the dispersed particles of rosin. The dissolved casein is run into the molten rosin under vigorous agitation, after which an additional small amount of caustic (0.2 part) is added or the hot rosin melt is injected into water containing casein. Water is finally added to produce a finished dispersion containing about 45% solids, which is used in this form. This method is sometimes referred to in the art as the "inversion process of preparing rosin size" and the rosin size thus produced referred to as "invert size".

Using the inversion process, Mashburn, U.S. Pat. No. 2,393,179 prepared a free rosin size using a nonalkaline dispersing agent, such as sulfonated higher fatty alcohol, in place of sodium hydroxide. The rosin is melted and the desired amount of dispersing agent is added with sufficient agitation to form a homogeneous molten mass. A substantially neutral or slightly acid aqueous solution or dispersion of a protective colloid, such as casein, is then added gradually with rapid stirring whereby there is produced a high solids paste-type dispersion which is then diluted with water to a solids content of 40% to 60% by weight.

Casey, at pages 1051 and 1052, discusses the Prosize process for producing a protected size containing a high free rosin content. The rosin particles are prevented from growing into larger aggregates by the presence of a surface-active protein such as soybean protein.

German Pat. No. 1,131,348 states that free rosin sizes are dispersions of unsaponified resin acids with a certain percentage of rosin soap. The dispersions are prepared by the inversion process. They are mostly used with free rosin content of 60% to 95% and contain besides rosin auxiliary emulsifiers and stabilizers such as stearates, triethanolamine, casein and waxes.

German Pat. No. 1,131,348 further states that, heretofore, the fortified rosins have not been suitable for the preparation of dispersions since they have mostly too high melting points, have a tendency to crystallization, or form, during dispersing, fine crusts which lead to sedimentation phenomena. German patent No. 1,131,348 discloses and claims a paper size and a process for the preparation of a paper size in the form of an aqueous dispersion with a high free rosin content from fortified rosin characterized in that the fortified rosin is mixed with fatty acids, fatty acid mixtures, and/or naphthenic acids at elevated temperatures and that the dispersion is carried out in the known manner. The process used in this patent is the inversion process.

U.S. Pat. No. 3,565,755 discloses a substantially homogengeneous stable aqueous suspension of rosin-base material in a state of fine subdivision. The rosin-base material can be all fortified rosin or it can be a rosin-fortified rosin mixture. A very small amount of the rosin-base material is saponified and functions as dispersing agent for the rosin-base particles. This composition, which consists essentially of the rosin-base material, the saponified rosin-base material, and water, is used in the sizing of paper. The size of U.S. Pat. No. 3,565,755 is a high free rosin size in that it contains only a very small amount of saponified rosin-base material. Further, it has good stability (good shelf life) for prolonged periods of time and does not require the use of stabilizers heretofore used in the preparation of stable high free rosin sizes such, for example, as casein and soybean protein.

In the process of U.S. Pat. No. 3,565,755, a material such as a salt of rosin or a salt of fortifed rosin, or an alkaline material, such as sodium hydroxide, is dissolved in water. The resulting aqueous solution is mixed with a solution of a water-immiscible organic solvent such as benzene, which has dissolved therein fortified rosin. The resulting mixture is homogenized to produce a stable emulsion and then the organic solvent is removed to provide a stable aqueous dispersion.

Australian Patent Application No. 69365/74, filed May 24, 1974, discloses a process for preparing an essentially stable aqueous dispersion of rosin-base material useful in the sizing of cellulosic papermaking fibers which comprises homogenizing under a pressure of from about 2000 p.s.i.g. to about 8000 p.s.i.g. and at a temperature of from about 150° C. to about 195° C. an unstable aqueous dispersion containing, by weight, at least 5% solids, the solids consisting essentially of, by weight, from 0% to about 95% rosin and from 100% to 5% of an adduct reaction product of rosin and an acidic compound containing the

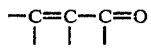

group, the amount of adducted acidic compound being from about 1% to about 20% of the total solids weight, characterized in that the process is carried out in the presence of an anionic dispersing agent. The anionic dispersing agent can be saponified rosin base material, sodium alkyl benzene sulfonate, sodium naphthalene sulfonic acid, sodium lauryl sulfate, and the ammonium salt of the sulfate ester of an alkylphenoxy(polyethyleneoxy)ethanol.

Swedish Patent Application No. 7410018-1 discloses a substantially stable aqueous dispersion, consisting essentially of water, rosin material, and as a stabilizer for the rosin material an alkali metal alkyl benzene sulfonate, said alkyl benzene sulfonate being present in an amount sufficient to stabilize said rosin material. The dispersions are prepared by passing a prepared mixture of the components through an homogenizer.

U.S. Pat. No. 3,906,142 of Sept. 16, 1975, discloses an agent for sizing paper without the use of aluminum sulfate, which comprises a stable aqueous dispersion of fortified rosin, fortified by reaction with an alpha, beta unsaturated carboxylic acid or anhydride; a protective colloid, such as casein; and a volatile base, such as ammonia; at least 90% of said fortified rosin being unsaponified.

The method used in U.S. Pat. No. 3,906,142 is the inversion process for preparing size and consists of melting fortified rosin in a vessel provided with stirring and heating mechanism. A dispersing and stabilizing agent is then prepared in a separate vessel by dissolving a measured quantity of a protective colloid, such as casein, and a measured quantity of a volatile base, such as ammonia in water. The next step in the manufacture of the sizing agent is to add quickly, to the molten rosin, the prepared dispersing and stabilizing agent, making use of high speed stirring or other intensive agitation of the mixture, during and after addition. The solids content of the resultant aqueous rosin dispersion is then adjusted by adding a calculated quantity of water thereto.

In accordance with this invention there is provided a method for preparing aqueous dispersions of fortified rosin by the inversion process wherein the use of protective colloids, such as casein, heretofore used in the inversion process is not essential.

This invention provides, in the inversion process of preparing paper size from fortified rosin wherein molten fortified rosin and water containing a dispersing agent are first mixed to provide an emulsion wherein the molten fortified rosin is the continuous phase and the water is the disperse phase and the emulsion is subsequently inverted by the addition of water to provide an emulsion wherein the water is the continuous phase and the fortified rosin is the disperse phase, the improvement wherein there is employed as the dispersing agent a water-soluble compound which provides in solution an anion having the formula

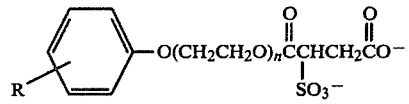

wherein R is a normal or branched chain alkyl containing 4 through 18 carbon atoms, and n is an integer 4 through 25. The value of n, as used herein, is an average value since, in the method of preparing the dispersing agents, ethylene oxide condensates varying in chain length are obtained in the condensation reaction. Examples of R are butyl, isobutyl, pentyl, isopentyl, hexyl, isohexyl, octyl, nonyl, dodecyl, tetradecyl, hexadecyl and octadecyl.

The aqueous dispersions prepared by the method of this invention will comprise, by weight, from about 5% to about 70% fortified rosin or fortified rosin blend (fortified rosin blended with unfortified rosin or extender or both as hereafter described) preferably from about 10% to 55%; from about 1% to about 10% dispersing agent, preferably from about 2% to about 8%, based on the fortified rosin or fortified rosin blend; and the balance water to 100%.

The rosin used to prepare the fortified rosin employed in this invention can be any of the commercially available types of rosin, such as wood rosin, gum rosin, tall oil rosin and mixtures of any two or more, in their crude or refined state. Rosins which have a tendency to crystallize may be treated, at elevated temperatures, with formaldehyde or paraformaldehyde in the presence of an acid catalyst, for example, p-toluene-sulphonic acid, in a manner known to those skilled in the art. Thus, formaldehyde treated rosin can be used to prepare the fortified rosin and is included in the expression "rosin" as used herein and in the claims.

The fortified rosin employed is the adduct reaction product of rosin and an acidic compound containing the

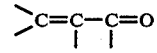

group and is derived by reacting rosin and the acidic compound at elevated temperatures, usually from about 150° C. to about 210° C.

The amount of acidic compound employed will be that amount which will provide fortified rosin containing from about 1% to about 12% by weight, preferably from about 4% to about 9% by weight, of adducted acidic compound based on the weight of the fortified rosin. Methods of preparing fortified rosin are disclosed and described in U.S. Pat. Nos. 2,628,918 and 2,684,300, reference to which is hereby made.

Examples of acidic compounds containing the

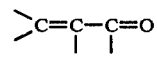

group that can be used to prepare the fortified rosin include the alpha-beta-unsaturated organic acids and their available anhydrides, specific examples of which include fumaric acid, maleic acid, acrylic acid, maleic anhydride, itaconic acid, itaconic anhydride, citraconic acid and citraconic anhydride. The preferred adducting acid is fumaric acid. Mixtures of acids can be used to prepare the fortified rosin if desired. Also mixtures of different fortified rosins can be used if desired. Thus, for example, a mixture of the acrylic acid adduct of rosin and the fumaric acid adduct can be used to prepare the invert sizes of this invention.

The fortified rosin can be extended, if desired, by known extenders therefor such as waxes, particularly paraffin wax and microcrystalline wax; hydrocarbon resins including those derived from petroleum hydrocarbons and terpenes; and the like. This is accomplished by melt blending or solution blending with the fortified rosin up to about 100% by weight based on the weight of fortified rosin of the fortified rosin extender. If an extender is to be blended with the fortified rosin, the preferred amount of extender employed will be from about 30% to about 50% by weight based on the weight of the fortified rosin.

Also, blends of fortified rosin and unfortified rosin can be used in carrying out this invention as well as blends of fortified rosin, extender and unfortified rosin.

Fortified rosin-unfortified rosin blends will comprise about 25% to about 99% fortified rosin and about 75% to about 1% unfortified rosin. Blends of fortified rosin, rosin and rosin extender will comprise about 25% to 49% fortified rosin, about 5% to 50% unfortified rosin and about 1% to 50% fortified rosin extender.

If rosin (that is, unfortified rosin) is blended with the fortified rosin, it can be any of those used in the preparation of the fortified rosin as above set forth. In addition partially or substantially completely hydrogenated rosins and polymerized rosins, can be used if desired.

The dispersing agents used to prepare the dispersions of this invention are water-soluble compounds represented by the formula

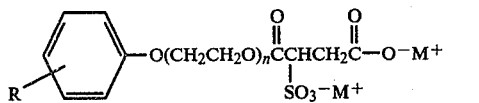

wherein R and n are as defined hereinbefore.

In formula (I) M+ is any suitable cation that will allow substantial dissolution of the dispersing agent in water.

Preferably M+ is an alkali metal ion such as potassium, sodium, lithium and cesium; ammonium (NH$_4$+); and mono(hydroxyethyl)ammonium. One M+ can be the hydrogen ion (H+) if desired.

Water soluble dispersing agents of formula (I) are prepared by known methods. Thus, for example, ethylene oxide is condensed with an alkyl phenol, such as octyl phenol, by wellknown methods to provide a condensate of the formula

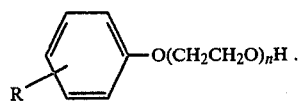

As above set forth, the value of n is an average value since ethylene oxide condensates varying in chain length are obtained in the condensation reaction. The condensate is then reacted with maleic anhydride or maleic acid and the resulting reaction product subsequently reacted with a water-soluble sulfite, such as sodium sulfite, whereby a water-soluble salt of formula (I) is obtained. Sodium salts of the sulfosuccinate esters of ethylene oxide condensates of alkyl phenols are available commercially; a specific example being that available under the proprietary designation Aerosol A103.

In carrying out the process of this invention a known quantity of fortified rosin, together with any desired extender or unfortified rosin or both, is heated to fusion in a vessel provided with stirring apparatus and heating means to provide a fused resinous mass (fused resin). The temperature of the fused resin will usually be in the range of about 90° C. to about 160° C. If low melting extenders are to be blended with the fortified rosin, the fused temperature of the blend could be lower than 90° C.

A solution of the dispersing agent in water is added to the fused resin, with continuous stirring of the resin melt, to form an emulsion in which the water is the disperse phase and the fused resin is the continuous phase. The amount of dispersing agent in the aqueous solution will be that sufficient to provide from about 1% to about 10%, preferably, from about 2% to about 8%, by weight of dispersing agent based on the fused resin. The amount of water employed at this stage is that amount sufficient to provide an emulsion as above described having a total solids content of, by weight, from about 70% to 86%, depending upon the particular dispersing agent used and its concentration.

Subsequently, additional hot water (inversion water) at a temperature of about 70° C., and higher if desired, is added with vigorous stirring. At a water to resin ratio of about 30:70 the emulsion inverts, the water becoming the continuous phase and the resin becoming the dispersed phase. On cooling the resin solidifies and there is provided an aqueous dispersion of finely divided resin particles. The resin particles will be fortified rosin particles or particles of fortified rosin blend as above described. The aqueous dispersion can be diluted to a lower solids content, if desired, by the addition of water.

It has been determined that dispersions of this invention have good stability at a pH of from about 3.0 to about 5.5. Adjustment of the pH can be made by adding an alkali, preferably sodium hydroxide, to the inversion water or to the aqueous solution of dispersing agent in an amount to bring the aqueous dispersion to the desired pH.

It will be understood by those skilled in the art, that the process of this invention can be carried out in an open vessel at atmospheric pressure or under pressure, in a closed vessel.

As above set forth, the initial temperature of the fused resin (fortified rosin or fortified rosin blend) will be in the range of about 90° C. to about 160° C. If the process is carried out at atmospheric pressure and the initial resin temperature is above 100° C., the temperature will drop on addition of the aqueous solution of dispersing agent due to partial evaporation of the water. If the preparation be carried out in a closed vessel under steam pressure so that evaporation of the water is retarded, the temperature can be maintained at a level above 100° C. The rate of addition of the aqueous solution of dispersing agent and the inversion water and degree of agitation can be varied over a wide range and is within the skill of the art. However, the rate of addition of inversion water and degree of agitation are normally speeded up at the point of inversion to insure rapid and complete inversion to the resin-in-water dispersion. The temperature at the point of inversion is in the range of about 70° C. to about 150° C. and preferably from about 90° C. to about 130° C.

The process can also be carried out in two stages by feeding the molten resin and the hot water solution of the dispersing agent to a mixer to provide the water-in-resin dispersion. Subsequently, the water-in-resin dispersion and hot inversion water are fed, in separate streams, to a second mixer maintained at a temperature of about 70° C. to 150° C. where the inversion takes place. The resulting aqueous dispersion is then recovered from the second mixer.

Stable resin-in-water dispersions are prepared by the process of this invention. The particles comprising the dispersed phase are relatively small, not more than about 10% of the particles being larger than about 0.4 micron.

EXAMPLE A

This example illustrates the preparation of fumaric acid fortified rosin. Fumaric acid, 8 parts, was adducted, at a temperature of about 200° C. with tall oil rosin, 92 parts. The fumaric acid dissolves in the fused rosin and reacts therewith to provide fumaric acid fortified rosin. After substantially all the fumaric acid has reacted with the rosin, the fortified rosin was cooled to room temperature (about 23° C.).

The following examples illustrate the preparation of fortified rosin dispersions in accordance with this invention. All parts and percentages are by weight unless otherwise specified.

EXAMPLE 1

Fumaric acid fortified rosin, prepared as in Example A (100 parts), was melted and heated to 145° C. in a baffled stainless steel container. To the stirred molten fortified rosin was added, over a period of 5 minutes, about 21 parts of a 23.3.% Aerosol A103 dispersant solution in distilled water which had been heated to 95° C. Aerosol A103 dispersant is the disodium salt of ethoxylated nonylphenol (9.5 moles of ethylene oxide per mole of nonylphenol) half-ester of sulfosuccinic acid. Considerable water evaporated during the addition of the surfactant solution. The temperature of the mixture, after this addition was complete, was 95° C. Additional 90° C. hot water (20 parts) was added to the stirred mixture to give a smooth, creamy-white, water-in-resin emulsion of approximately 80% solids content. 70 parts of 90° C. hot water was then added with vigorous stirring over a period of one minute, causing the emulsion to invert to a resin-in-water emulsion, which was rapidly cooled to 30° C. The resulting aqueous dispersion had a solids content of 51.4%, had a blue-white appearance, passed completely through a 100-mesh screen, and had excellent storage stability. The product has utility as a paper size.

EXAMPLE 2

The apparatus employed in this example consisted of three precision pumps, two in-line mixers, two pressure receivers, pressure control auxiliaries, and heated tubing connecting these units. Fumaric acid fortified tall oil rosin, prepared in accordance with Example A, was heated to about 140° C. and pumped into a first mixer, which was maintained at 125° C., at a rate of 4.12 parts per minute, where it was mixed with an 11.8% solution of Aerosol A103 dispersing agent in distilled water heated to 80° C. which was being pumped into said first mixer at a rate of 1.66 parts per minute, to provide a water-in-resin emulsion having a solids content of 70%. This emulsion was pumped into a second mixer, maintained at 105° C., where it was mixed with distilled water heated to 90° C. which was being pumped into said second mixer at a rate of 3.5 parts per minute. A resin-in-water emulsion having a solids content of 45% was formed which was subsequently cooled rapidly to below 50° C.

EXAMPLE B

Fumaric acid fortified tall oil rosin was prepared as in Example A with the exception that about 7.5 parts of fumaric acid was employed and 92.5 parts of tall oil rosin was employed. The fumaric acid fortified tall oil rosin had an acid number of 215 and had a combined fumaric acid content of about 7%.

EXAMPLE 3

Fumaric acid fortified rosin of Example B (200 parts) was melted and heated to 134° C. in a baffled stainless steel container. To the stirred molten fortified rosin was added, over a period of 5 minutes, 40 parts of a 20% Aerosol A103 dispersant solution in distilled water which had been heated to 95° C. Considerable water evaporated during the addition of the surfactant solution. The temperature of the mixture, after this addition was complete, was 106° C. Additional 90° C. hot water (80 parts) was added to the stirred mixture to give a smooth, creamy-white, water-in-resin emulsion of approximately 80% solids content. 180 parts of 90° C. hot water was then added with vigorous stirring over a period of one minute, causing the emulsion to invert to a resin-in-water emulsion, which was rapidly cooled to 30° C. The resulting aqueous dispersion had a solids content of 45.9%.

The dispersion of Example 3 was used to surface size unsized paper sheets made with 50% bleached kraft soft wood and 50% bleached kraft hard wood pulps to 500 Canadian Standard Freeness. The paper sheets were prepared on a pilot paper machine at pH 4.5 with 2.5% alum added. After surface application of the dispersion, the sheets were drum dried and aged 24 hours before testing. Three levels of size were applied, as shown in Table I below. Hercules Sizing Tests show good sizing results. These data are set forth in Table I.

TABLE I

| % Size Applied (based on dry weight of paper) | Hercules Sizing Test Seconds |
| --- | --- |
| 0.07 | 41 |
| 0.14 | 147 |
| 0.28 | 290 |

EXAMPLE 4

A fumaric acid adduct of formaldehyde treated tall oil rosin containing about 7.5% combined fumaric acid was melted and heated to 140°-145° C. in a baffled 500 milliliter stainless beaker provided with a stirrer. Stirring was started and a hot (95°-100° C.) aqueous solution of a dispersing agent, as shown in Table II below, was added slowly (4–5 minutes) to the melted adduct with vigorous stirring to prevent foaming as the water vaporized. The hot aqueous solution of dispersing agent contained 4.2 grams of dispersing agent and 16.8 grams of distilled water. The stirring blended the dispersing agent quickly, though much of the water was vaporized, particularly at the beginning of the addition. At the end of the addition the resulting mixture is at about 95° C. and additional hot (90°-95° C.) water is added to give a mixture with a smooth creamy-white appearance typical of an invert emulsion ready to be inverted. After the last water addition is complete, stirring was continued for a minute or two to insure a homogeneous mixture. The total solids of the mixture at this point was about 80%. Then about 80-100 grams hot (90°-95° C.) water was added rapidly (one minute) from a separatory funnel with vigorous stirring. Table II shows whether or not the emulsion inverted.

Table II

| Dispersing Agent | % Dispersing Agent | Results |
|---|---|---|
| 1. Disodium ethoxylated alcohol half ester of sulfosuccinic acid (mixed $C_{10}$-$C_{12}$ alcohols) - available commercially as Aerosol A102 | 4.2 | did not invert |
| 2. Disodium ethoxylated nonylphenol half ester of sulfosuccinic acid - available commercially as Aerosol A103, same as used in Example 1 | 4.2 | inverted[1] |
| 3. Disodium abietyl sulfosuccinate | 4.2 | did not invert |
| 4. Purified dodecylbenzene sodium sulfonate - available commercially as Siponate DS10 | 4.2 | did not invert |
| 5. Sodium salt of alkylaryl polyether sulfonate - the polyether portion is 10 oxyethylene units - available commercially as Triton X202 | 4.2 | did not invert |

[1]This was a good emulsion having about 51.4% total solid - % total solids after centrifuging test 51.2%, % settled solids 0.4%.

It is to be understood that the above description, including examples, is illustrative of the invention and not in limitation thereof.

What I claim and desire to protect by Letters Patent is:

1. In the invention process of preparing paper size from fortified rosin wherein molten fortified rosin and water containing a dispersing agent are first mixed to provide an emulsion wherein the molten fortified rosin is the continuous phase and the water is the disperse phase and the emulsion is subsequently inverted by the addition of water to provide an emulsion wherein the water is the continuous phase and the fortified rosin is the disperse phase, the improvement wherein there is employed as the dispersing agent one or more water-soluble compounds which provide in solution one or more anions of the formula

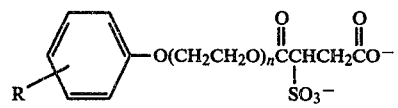

wherein R is a normal or branched chain alkyl containing from 4 through 18 carbon atoms, and n is an integer 4 through 25.

2. The process of claim 1 wherein the anion is derived from a water-soluble compound containing the anion and any suitable cation that will permit substantial dissolution of the compound in water.

3. The process of claim 1 wherein, in the anion, R is nonyl and n is an average value 9.5.

4. The process of claim 2 wherein the cation is selected from the group consisting of sodium, potassium and ammonium.

5. The process of claim 3 wherein the cation is selected from the group consisting of sodium, potassium and ammonium.

6. An invert size prepared by the process of claim 1.
7. An invert size prepared by the process of claim 2.
8. An invert size prepared by the process of claim 3.
9. An invert size prepared by the process of claim 4.
10. An invert size prepared by the process of claim 5.